3,531,447
SULFUR-VULCANIZABLE COPOLYMERS OF ETHYLENE, PROPYLENE AND 5 - (2'- AND/OR 3'-METHYL - 2 - BUTENYL-) - NORBORNENE - (2) AND PROCESS FOR PREPARING THEM
Albert Gustav Martin Gumboldt, Frankfurt am Main, Jürgen Helberg, Kelkheim, Taunus, and Hans-Dieter Stemmer, Hattersheim (Main), Germany, assignors to Farbwerke Hoechst Aktiengesellschaft, Frankfurt am Main, Germany, a corporation of Germany
No Drawing. Filed Mar. 16, 1967, Ser. No. 623,538
Claims priority, application Germany, Mar. 19, 1966, F 48,705
Int. Cl. C08d 3/04; C08f 15/40, 27/06
U.S. Cl. 260—80.78                                   7 Claims

ABSTRACT OF THE DISCLOSURE

Sulfur-vulcanizable copolymers of ethylene, propylene and 5-(2'-methyl-2'-butenyl-)-norbornene-(2) or 5-(3'-methyl-2'-butenyl-)-norbornene-(2) prepared in the presence of a mixed catalyst of a vanadium compound soluble in inert solvents, an organoaluminum compound, alkyl aluminum sesquichloride or alkylaluminum dichloride and activators such as trichloroacetic acid ester, thionyl chloride, hexachlorocyclopentadiene or hexachlorocyclopentenone.

---

The present invention provides sulfur-vulcanizable copolymers of ethylene, propylene and 5-(2'- and/or 3'-methyl-2'-butenyl-)-norbornene-(2) and a process for preparing them.

It is known that ethylene and propylene can be converted into high molecular copolymers with organo-metallic catalyst mixtures known as "catalyst of the Ziegler type" and generally used in industry, at pressures ranging from 0 to 30 atmospheres gage and at temperatures in the range of from −30 to +150° C. (so-called low-pressure process).

Having a content of more than 25% by weight of α-olefin these products are elastomeric, but they practically do not have double bonds vulcanizable with sulfur and can only be crosslinked by relatively expensive and very disadvantageous methods such, for example, as a treatment with peroxides or a high-energy radiation to yield products of an elastomeric nature.

It is furthermore known that copolymers prepared from ethylene, propylene and di- or poly-olefins by the low-pressure process, can be vulcanized with sulfur to yield products having an elastomeric nature. It is particularly proposed in the literature to use open-chained and cyclic aliphatic dienes such, for example, as hexadiene-1,4 and dicyclo-pentadiene as termonomers.

It is also known that copolymers containing at least 20% by weight of ethylene, at least 25% by weight of an α-olefin and at least 0.03 mol per 100 grams of a copolymer, at most 20% by weight of a 5-alkenyl-2-norbornene having a double bond in medium position in the aliphatic chain, can be rapidly vulcanized with sulfur to yield elastomers having a sufficient elasticity modulus (cf. U.S. Pat. No. 3,093,620). In this known process, $VCl_4$ to $VOCl_3$ and organo-aluminum compounds of the formula $(R)_3Al$ or $(R)_2AlX$ in which X represents an alkyl group having one to 12 carbon atoms and X represents a chlorine or a bromine atom, are used as catalysts.

It has now been found that copolymers which yield rubber on being vulcanized with sulfur and which have valuable properties can be prepared from ethylene, propylene and a 5-alkenyl-2-norbornene having a double bond in medium position in the aliphatic chain, in the presence of catalyst combinations of vanadium compounds and organo-aluminum compounds by copolymerizing at least 20% by weight of ethylene, at least 20% by weight of propylene and at least 2.0% by weight, at most 4.7% by weight, of 5-(2'- and/or 3'-methyl-2-butenyl-)-norbornene-(2) in the presence of mixtures of (a), (b) and (c):

(a) Vanadium halide compounds soluble in inert dispersing agents, and
(b) Organo-aluminum compounds of the formulae $R_3Al_2Cl_3$ and/or $RACl_2$ in which R represents alkyl radicals containing 1 to 6 carbon atoms, and eventually
(c) Trichloroacetic acid esters, thionyl chloride, hexachlorocyclopentadiene or hexachlorocyclopentone as reactivators according to the low-pressure process, i.e. at low pressures and at low temperatures.

It is surprising and new that the copolymerization of ethylene, propylene and a maximum of 4.7% by weight (=0.029 mol per 100 grams of copolymer) of 5-(2'- and/or 3'-methyl-2'-butenyl-)-norbornene-(2) of the formula

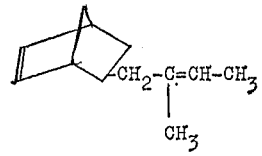

referred to as 2'-MBN in the following

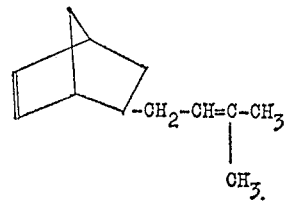

referred to as 3'-MBN in the following already provides a caoutchouc that can be vulcanized with sulfur at high speed and has certain favorable properties peculiar to multi-purpose caoutchoucs (natural caoutchouc, butadiene styrene caoutchouc), for example good elastic properties at low temperatures, good stability in processing, static-mechanic properties advantageously combined, a favorable behaviour under dynamic strain (weak crack growth under the evolution of heat) in addition to those which are only inherent in special caoutchous (butyl caoutchouc, chlorobutadiene, caoutchouc), for example resistance to weather and ozone, stability to lyes and oxidizing alkali metal compounds, good electrical insulating properties, favorable stability to thermal aging, low marching modulus. An advantage of the terpolymers of ethylene, propylene and MBN of the invention is moreover the fact that the physical properties of the products are far less adversely affected by an addition of high doses of active fillers and extending oils to those of the known caoutchoucs such as styrene-butadiene or natural caoutchouc.

Generally, the copolymers of ethylene, propylene and diolefin can advantageously be prepared and processed when using as termonomer diolefins the one double bond of which is only highly reactive in the polymerization and the other is only very reactive in the vulcanization.

It has now been found that these demands which have to be made on an tercomponent, are answered to an extraordinary extent by 5-(2'-methyl-2'-butenyl)-norbornene-(2) [2'-MBN] and 5-(3'-methyl-2'-butenyl-)-norbornene-(2) [3'-MBN] or by any mixture of these two isomers, as can be seen from Table 1.

The high reactivity (r-value) of a double bond in the polymerization has the advantage that a relatively low termonomer proportion is sufficient to yield a content of double bonds in the polymer, which is most advantageous for the vulcanization and for the properties of the vulcanizate, and that a high mileage of the usually expensive termonomer, i.e. the ratio between the amount of termonomer incorporated by the polymerization and the amount used, is achieved in a single through-put. A poor mileage of the termonomer naturally gives rise to problems in the recovery and work-up of the diolefin.

Moreover, when the termonomer concentration is small, the inhibiting action on the catalyst activity, inherent in every diolefin to a differing extent, is comparatively weak and thus the mileage of the catalyst, i.e. the ratio between polymer yield and catalyst consumption, is high.

A small termonomer concentration, furthermore, reduces the undesired tendency to cross-link, which is peculiar to every diolefin to a differing extent.

It is desired that the second double bond of the diolefinic tercomponent is indifferent in the polymerization, since otherwise the polymer would form a gel. This raises difficulties in the polymerization (formation of deposits in the polymerization vessel, reduction of the catalyst activity) and in the work-up (the ashes are difficult to remove) and, in addition, the result is poor properties of the vulcanizate.

In the cross-linking with sulfur, however, the second double bond must be highly reactive to assure a vulcanization speed which is sufficient for processing the caoutchouc.

The indications given in column 4, line 44 of U.S. Pat. No. 3,093,620 have kept those skilled in the art from trying to incorporate a proportion less than 0.03 gram mol per 100 grams of copolymer, of the known MBN-termonomer into the copolymer.

It was also not at all obvious that a combined modification, compared to the known process, such as the variation of the amount of termonomer to be incorporated and the change of the catalyst components, would be a technical advantage and would yield elastomeric substances resulting in sulfur-vulcanizates which have excellent properties. Neither the mode of preparing the substances of the invention nor the mode of the combination of the advantageous properties of these substances are suggested by the U.S. patent mentioned above, which comes nearest to the present invention.

It is surprising that the copolymerization of a maximum amount of 4.7% by weight of 2'- and/or 3'-MBN with ethylene and propylene is completely sufficient to provide such a high vulcanization speed as is reached, if at all, by other ethylene propylene-diolefin caoutchoucs only with a considerably higher content of diolefin, and that, however, just the copolymerization of a maximum amount of 4.7% by weight of 2'- and/or 3'-MBN yields products which, compared with terpolymers having a higher content of diolefin, possess considerably improved vulcanizate properties as regards their behavior under dynamic stress and towards thermal aging as well as their resistance to weather and ozone, without losing other valuable vulcanizate properties. These improvements are surprising and cannot have been expected. They are of such an importance and represent such a technical advance that the products of the invention throw open completely new fields of application for the ethylene-propylene-diolefin rubber, for example in the field of treads, sealing material for washing machines and dish washing machines, high-tension cables and lead insulations, composites of metal and fabrics, conveyor bands, V-belts, tubes, tires and the like.

Another result of the low MBN-concentration of the present invention in the copolymerization are the advantages mentioned and gained from a high mileage of the termonomer and the catalyst and the reduced risk of gel formation. All these factors are decisive for carrying out the polymerization process on an industrial scale and in an economical manner.

The copolymers having the good vulcanizate properties mentioned can be prepared in the manner mentioned above in the presence of catalyst combinations of (a) Vanadium halide compounds soluble in inert dispersing agents,
(b) Organo-aluminum compounds of the formula $$R_3Al_2Cl_3$$

and/or $RAlCl_2$, in which R represents an alkyl radical having 1 to 6 carbon atoms and, possibly,
(c) Reactivators for the catalysts, such as trichloroacetic acid ester, thionylchloride, hexachlorocyclopentadiene or hexachlorocyclopentenone.

When aluminum trialkyls or dialkylaluminum monohalides as known from U.S. Pat. No. 3,093,620 cited are used instead of alkyl-aluminumsesquichlorides or alkyl-aluminumdichlorides used according to the invention, copolymers having poorer vulcanizate properties are obtained with a reduced catalyst mileage, as can be seen from the comparative tests given later on.

Besides, the alkylaluminum sesquichlorides and alkyl-aluminum dichlorides used according to the invention are more easily obtainable than the aluminum organyls having a higher degree of alkylation, and can moreover be handled with less danger.

Among alkylaluminum sesquichlorides and alkylaluminum dichlorides the ethylaluminum sesquichloride is preferred.

Among the vanadium halide compounds soluble in inert dispersing agents there is preferably used $VOCl_3$. But other vanadium halides such as $VCl_4$, $VO(OC_2H_5)Cl_2$, $VO(OC_2H_5)_2Cl$, can also be used.

By using the known reactivators, the mileage of the catalyst can considerably be increased and the molecular weight of the copolymers can be controlled. Among the reactivators already mentioned trichloroacetic acid esters are preferred on account of their high activity and the small amounts needed. The amounts of reactivator required depend in particular on the activity of the reactivator used.

A highly active mixed catalyst appropriate for the copolymerization is prepared by adding a solution each of the vanadium compound and of the organo-aluminum compound separately and continuously to the polymerization batch at a constant ratio. The reactivator compound may be preliminarily mixed with the vanadium compound or it may also be dropped in separately.

When the catalyst components are introduced simultaneously into the polymerization vessel before starting the polymerization, there is obtained, for a short period of time, a high polymerization rate which, however, decreases very quickly, whereby the catalyst mileage is rather poor. Furthermore, products are obtained which have a disadvantageous chemical distribution of the monomer unities in the macromolecule and an undesirably great molecular inhomogeneity. The result thereof is disadvantageous properties of the vulcanizates.

When during the polymerization the ratio between aluminum and vanadium is modified, products which also have a great molecular inhomogeneity are obtained.

It is advantageous to use the catalyst components as solutions in inert dispersing agents in which the polymerization takes place also (see below).

The molar ratio between aluminum organyl and vanadium halide may be varied within wide limits, for example in the range of from 1 to 30, preferably from 5 to 15.

When trichloroacetic acid ester or thionyl chloride is used as the reactivator, the molar ratio between aluminum organyl and reactivator chosen is in the range of from 2 to 8, preferably 3 to 4, and the molar ratio between vanadium halide and reactivator is in the range of from 0.1 to 1.0, preferably from 0.25 to 0.5. When hexachlorocyclopentadiene is used as the reactivator, the molar ratio between aluminum organyl and reactivator ranges from 0.1 to 1.0, preferably 0.15 to 0.5, and the molar ratio between vanadium halide and reactivator ranges from 0.005 to 0.2, preferably 0.01 to 0.05. When, however, a reactivator is used which consists of a mixture of 66% of hexachlorocyclopentadiene, 12% of asymmetric hexachlorocyclopentenone and 22% of symmetrical hexachlorocyclopentenone, the molar ratio between aluminum organyl and reactivator chosen ranges from 1 to 5 and the molar ratio between vanadium halide and reactivator ranges from 0.05 to 0.25.

The catalyst concentration in the polymerization batch may also vary within wide limits, for example in the range of from 0.01 to 10 millimols of vanadium halide per liter of solvent, preferably from 0.1 to 1.0 millimol of vanadium halide per liter.

The copolymerization is carried out in inert dispersing agents such as hexane, cyclohexane, methylcyclohexane, in chlorohydrocarbons such as tetrachlorethylene, 1,2 - dichlorethane, methylene chloride or in mineral oil fractions boiling at the same temperatures as diesel oils and which have been carefully liberated from oxygen and sulfur compounds, from unsaturated compounds and remaining moisture. The copolymerization may, however, be also carried out in liquid propylene.

The copolymerization may be carried out at temperatures in the range from +15° C. to +100° C., preferably from 30° to 70° C. A polymerization carried out at a temperature below 15° C. gives rise to considerable technical difficulties, in particular the dissipation of the polymerization heat is very difficult and requires great technical expenditure. Besides, at low temperatures, the molecular weight can only be imperfectly regulated.

The copolymerization can be carried out at pressures ranging from 1 to 25 atmospheres, preferably from 1 to 10 atmospheres. It can be carried out in batches and cotninuously, preferably in continuous manner.

The continuous copolymerization is carried out by continuously pumping an inert dispersing agent in several streams into a reaction vessel provided with stirrer and several short tubes. The four separate streams have the following composition:

(1) Stream: A mixture of ethylene and propylene of a determined composition,
(2) Stream: The termonomer 2'-MBN and/or 3'-MBN of the invention in a determined concentration,
(3) Stream: The organo-aluminum component in a determined concentration,
(4) Stream: The vanadium compound, eventually combined with a reactivator, in a determined concentration.

The catalyst components are metered at a determined ratio and in constant amounts. A constant pressure in the polymerization vessel is maintained by adding a determined amount of ethylene and propylene to the first stream, depending on the catalyst activity. The dosage of the termonomer amount is exactly adjusted to the absorption of ethylene/propylene in order to obtain a favorable, if possible statistical, distribution of double bonds in the copolymer. The polymerization heat is dissipated by cooling the vessel. A constant temperature is maintained. The retention time of the reaction mixture in the vessel may vary within wide limits, it advantageously ranges from 20 to 60 minutes. The polymer solution is continuously discharged from the vessel. The catalyst is disactivated by means of alcohols such as methanol, ethanol, isopropanol, butanol or water. The polymer solution is extracted with water and a stabilizer is added. Finally, the polymer is liberated from the dispersing agent by distillation with steam. The polymer is dried by means of usual drying devices known in the rubber industry.

In principle, the discontinuous copolymerization can be carried out in the same manner as the continuous copolymerization, only that care has to be taken that, at the beginning of the polymerization, the correct monomer mixture of ethylene, propylene and MBN which is necessary for the preparation of products of a homogeneous composition, is already present.

The high-molecular elastomeric copolymers prepared in this manner are stable even when stored over a long period of time. According to known prescriptions, they can be vulcanized with sulfur and, according to known methods, they can be processed into rubber goods of various kinds.

The following examples serve to illustrate the invention, but they are not intended to limit it thereto.

TABLE 1

Ethylene, propylene and several termonomers were copolymerized with a catalyst combination of $VOCl_3$ and

| Termonomer | $r$-Value compared with $C_3H_6$ | Tendency to form a gel | Vulcanization speed [1] |
|---|---|---|---|
| Known alkenyl norbornenes: | | | |
| R: =$CH_2$ | 8 | Very prounonced | Moderate. |
| R: —CH=$CH_2$ | 7 | Moderate | Do. |
| R: —$CH_2$—$CH_2$—CH=$CH_2$ | 8 | Very pronounced | Yield no usable vulcanizates. |
| R: —⟨⟩ | 9 | Very weak | Very low. |
| Alkenyl norbornenes according to the the invention: | | | |
| R: —$CH_2$—C=CH—$CH_3$, $CH_3$ | 9 | Very weak | Very high. |
| R: —$CH_2$—CH=C—$CH_3$, $CH_3$ | .5 | do | Do. |
| Dienes known as termonomers: | | | |
| Dicyclopentadiene | 8 | Moderate | Low. |
| Cis-hexadiene-1,4 | 0.5 | Weak | Moderate. |
| Trans-hexadiene-1,4 | 1 | do | Do. |
| 4-methyl-cis-1,4-hexadiene | <0.1 | | Yield no usable vulcanizates. |
| 5,7-dimethyl-1,6-octadiene | 1 | | Do. |
| 1,3-butadiene [2] | <0.5 | | Do. |

[1] Vulcanization at 160° C. with the following mixture: 100 parts of caoutchouc, 5parts. of ZnO, 2 parts of Thiuram MS, 1.5 parts of sulfur and 50 parts of HAF-black.
[2] Contaminates the catalyst completely.

(C$_2$H$_5$)$_3$Al$_2$Cl$_3$ in hexane under comparable conditions and the copolymers formed having a comparable content of double bonds were vulcanized subsequently. (The gel content of the copolymers was determined by the proportion which is insoluble in toluene, the vulcanization speed was determined by the time required for a 90%-increase of the modulus in the Agfavulcameter.)

EXAMPLE 1

Continuous copolymerization.—A reaction vessel having a capacity of 15 liters, provided with a stirrer and several short tubes, was continuously charged with hexane in several streams which contained:

(1) A mixture of ethylene and propylene in a determined composition,
(2) A mixture of 70% of 2′-MBN and 30% of 3′-MBN in a determined concentration,
(3) Ethylaluminum sesquichloride (Al) in a determined concentration,
(4) Vanadium oxy chloride (V), possibly combined with trichloroacetic acid methyl ester (TEC), in a determined concentration.

The catalyst components were metered at a determined ratio and in constant amounts. A constant pressure in the polymerization vessel was maintained by adding a determined amount of ethylene and propylene to the first stream, depending on the catalyst activity. The dosage of MBN was exactly adjusted to the dosage of ethylene and propylene.

A constant temperature in the vessel was maintained by jacket-cooling with water.

A determined medium retention time of the catalyst in the vessel was adjusted by feeding a determined amount of the total amount of hexane into the vessel and discharging the same from the vessel. The solution of polymer in hexane formed in the vessel was continuously discharged by means of a gear pump and stirred with distilled water in a container having a capacity of 200 liters. Simultaneously, 0.2% by weight of bis-(4 - hydroxy - 3-tert.butyl-6-methyl-phenyl) - sulfide ("Santonox®"), referred to the polymer, was added thereto. The water was allowed to deposit and was separated from the polymer solution. The polymer was finally liberated from hexane by a distillation with steam in a stirring vessel. The polymer was obtained in the form of pellets (diameter ranging from about 3 to 10 millimeters) and was dried in vacuo at a temperature in the range from 70 to 100° C.

The details concerning the copolymerization can be seen from Table 2.

EXAMPLE 2

Discontinuous copolymerization.—6 liters of hexane were saturated, while stirring, under exclusion of air and moisture, with a gas mixture of 3 parts by volume of ethylene and 7 parts by volume of propylene in a glass vessel of a capacity of 12 liters, provided with a high-grade steel stirrer having a perforated blade, 3 ground dropping funnels, a reflux condenser followed by a mercury excess pressure release valve, a gas feeding tube and a tube for the thermometer, at the same temperature at which the polymerization subsequently took place. A determined amount of MBN was then introduced in the form of the pure 2′-MBN-isomer or as a mixture of 70% of 2′-MBN and 30% of 3′-MBN.

After care had been taken in this way that, prior to the polymerization, the correct monomer mixture of ethylene, propylene and MBN required for the preparation of products of a homogeneous composition, was present, the hexane solution was fed with another determined amount of ethylaluminum sesquichloride or ethylaluminum dichloride and then the feed of gas was cut. Subsequently, a determined amount of ethylaluminum sesquichloride or ethylaluminum dichloride dissolved in 500 milliliters of hexane and a determined amount of vanadium oxy chloride, possibly combined with trichloroacetic acid methyl ester (TCE), likewise dissolved in 500 milliliters of hexane, were continuously added dropwise to the polymerization solution over a period of 100 minutes. When the catalyst had been added, the polymerization was initiated shortly afterwards, a fact which could be noticed by a negative gage pressure, and for equalizing the pressure, the polymerization gas (ethylene and propylene in a ratio of 2:1) was introduced. The feed of gas was controlled so that the mercury pressure release valve attached to the apparatus indicated a range in pressure smaller than from +5 to −10 millimeters of mercury, without allowing waste gas to escape. In a manner corresponding to the feed of ethylene-propylene gas, a determined amount of MBN dissolved in 500 milliliters of hexane was added dropwise over the whole polymerization period so as to maintain a determined molar ratio between ethylene, propylene and MBN. After 2 hours, the polymerization was terminated by adding 2 liters of distilled water and simultaneously allowing nitrogen to pass through the batch. The batch was heated to a temperature of 60° C. and, after the first washing liquor had been removed, it was twice stirred with 2 liters of water each time, at 60° C. in order to remove the remaining catalyst. The solvent was then expelled with steam, the tough polymerization cake obtained was cut to pieces and dried in vacuo under a pressure of 200 millimeters of mercury and at a tem-

TABLE 2.—CONTINUOUS COPOLYMERIZATION UNDER ELEVATED PRESSURE

| Example | Temp. (° C.) | Pressure (atm.) | Throughput (liter hexane/hour) | Retention time (min.) | C$_2$H$_4$/C$_3$H$_6$/MBN (mol. parts) | VOCl$_3$ (mmol/l.) | AL:V:TCE (mol. parts) | Polymers content of the solution (percent by weight) | Catalyst mileage (g. polymer/g. VOCl$_3$) |
|---|---|---|---|---|---|---|---|---|---|
| 1a | 46 | 3 | 30 | 30 | 1:2.75:0.012 | 0.3 | 12:1:0 | 3.3 | 632 |
| 1b | 46 | 3 | 30 | 30 | 1:2.75:0.015 | 0.3 | 8:1:0 | 4.1 | 530 |
| 1c | 46 | 3 | 30 | 30 | 1:2.75:0.015 | 0.3 | 8:1:0 | 4.0 | 514 |
| 1d | 46 | 3 | 30 | 30 | 1:2.50:0.015 | 0.3 | 8:1:3 | 5.9 | 774 |
| 1e | 52 | 3 | 30 | 30 | 1:1.25:0.013 | 0.3 | 12:1:0 | 4.7 | 605 |
| 1f [1] | 44 | 3 | 30 | 30 | 1:2.50:0.030 | 0.3 | 8:1:0 | 4.3 | 555 |
| 1g [1] | 44 | 3 | 30 | 30 | 1:2.50:0.050 | 0.3 | 8:1:0 | 4.0 | 514 |
| 1h [1] | 44 | 3 | 30 | 30 | 1:2.50:0.070 | 0.3 | 8:1:0 | 3.8 | 488 |
| 1i [1] | 44 | 3 | 30 | 30 | 1:2.50:0.070 | 0.25 | 7.5:1:3 | 5.0 | 777 |

| Percent by weight of C$_3$H$_6$ in the polymer | Percent by weight of MBN in the polymer | Mileage of MBN (in percent) | Mooney viscosity | Reduced specific viscosity [2] | Percent of insoluble material in toluene | Ash content in percent by weight |
|---|---|---|---|---|---|---|
| 38.0 | 3.48 | 93 | 94 | 3.40 | 0.07 | 0.05 |
| 44.5 | 3.51 | 94 | 112 | 3.32 | 0.10 | 0.14 |
| 42.5 | 4.03 | 98 | 112 | 2.44 | 0.05 | 0.07 |
| 48.7 | 3.13 | 95 | 43 | 2.15 | 0.06 | 0.04 |
| 32.0 | 3.24 | 91 | 102 | 4.35 | 4.24 | 0.02 |
| 41.5 | 5.90 | 82 | 115 | 3.48 | 0.17 | 0.08 |
| 38.0 | 8.70 | 61 | 126 | 3.37 | 0.15 | 0.12 |
| 37.2 | 12.14 | 70 | 118 | 3.17 | 0.35 | 0.09 |
| 36.8 | 13.31 | 81 | 87 | 3.26 | 0.44 | 0.31 |

[1] Beyond the scope of the present invention (comparative examples).
[2] Reduced specific viscosity measured at 135° C. in a 0.1% decahydronaphthalene solution.

perature ranging from 60° to 70° C., until a constant weight was reached.

The details as to the copolymerization can be seen from Table 3.

The vulcanization speed expressed by the $t_{90}$-value, i.e. the time required for a 90%-increase in the modulus measured in an Agfa-vulcameter, and the static-mechanical properties of the vulcanizate at 29° C. are indicated

TABLE 3.—DISCONTINUOUS COPOLYMERIZATION UNDER ATMOSPHERIC PRESSURE

| Example | Al (mmols) Cl$_3$Al$_2$(C$_2$H$_5$)$_3$ | | V (mmols) VOCl$_3$ fed | TCE (mmols) fed | Hexane (liters) | Temp. (° C.) | MBN (mmols) | | | C$_2$/C$_3$/MBN (mol. parts) dropped in | Yield (gram) | Gram/hour mmol of V |
|---|---|---|---|---|---|---|---|---|---|---|---|---|
| | Present | Fed | | | | | Type | Present | Fed | | | |
| 2a [1] | 10 | 15 | 1.5 | 6 | 7.8 | 30 | 70% 2-MBN 30% 3-MBN. | 2.5 | 38 | 2/1/0.01 | 480 | 160 |
| 2b | 10 | 15 | 1.5 | 6 | 7.8 | 30 | 70% 2-MBN 30% 3-MBN. | 5 | 78 | 2/1/0.02 | 484 | 161 |
| 2c | 10 | 7.5 | 0.75 | 2.25 | 7.2 | 35 | 70% 2-MBN 30% 3-MBN. | 2 | 22 | 2/1/0.02 | 143 | 95 |
| 2d | 10 | 15 | 1.5 | | 7.3 | 35 | 70% 2-MBN 30% 3-MBN. | 5 | 25 | 2/1/0.02 | 154 | 51 |
| 2e | 10 | 20 | 2 | 10 | 7.7 | 40 | 2-MBN | 2 | 74 | 2/1/0.02 | 458 | 125 |
| 2f | [3]10 | [3]15 | 1.5 | | 7.2 | 35 | 70% 2-MBN 30% 3-MBN. | 5 | 24 | 2/1/0.02 | 159 | 53 |

| Example | Percent by weight of MBN | MBN-mileage (in percent) | Percent by weight of C$_3$H$_6$ | Percent of insoluble material in toluene | Reduced specific viscosity [2] | $M_{L4}$ |
|---|---|---|---|---|---|---|
| 2a [1] | 1.35 | 98 | 44.5 | 0.03 | 2.86 | 105 |
| 2b | 2.64 | 95 | 41.3 | 0.30 | 3.13 | 109 |
| 2c | 2.54 | 92 | 36.8 | 0.02 | 3.32 | 150 |
| 2d | 2.70 | 89 | 39.0 | 0.04 | 3.86 | 170 |
| 2e | 2.60 | 96 | 37.4 | 0.06 | 1.51 | 35 |
| 2f | 2.65 | 90 | 38.7 | 0.03 | 3.94 | >150 |

[1] Beyond the scope of the present invention (comparative example).
[2] Reduced specific viscosity measured at 135° C. in a 0.1% decahydronaphthalene solution.
[3] Instead of ethylaluminum sesquichloride there was used ethylaluminum dichloride.

EXAMPLE 3

(Beyond the scope of the invention)

Discontinuous copolymerization.—When instead of alkylaluminum sesquichlorides or alkylaluminum dichlorides, aluminum trialkyls or dialkyl-aluminum monochlorides were used while operating, for the rest, in the manner described in Example 2, there were obtained copolymers having poorer vulcanizate properties, and the catalyst mileage was smaller.

The details as to the polymerization can be seen from Table 4, the vulcanizate properties can be seen from Table 5.

in Table 5. The table shows that a high vulcanization speed and good static-mechanical vulcanizate properties can be obtained with copolymers of ethylene, propylene and MBN prepared by a continuous as well as discontinuous polymerization.

An increase of the MBN-content, with all the other parameters being maintained constant, brought to a certain extent about the following changes in the vulcanizate properties: Increase in vulcanization speed and modulus. Decrease in the elongation at break, the notched elongation, the permanent extension and the impact strength. Tensile strength, resilience and hardness were practically not affected.

TABLE 4.—DISCONTINUOUS COPOLYMERIZATION UNDER ATMOSPHERIC PRESSURE

| Example | Al(mmols) | | | V (mmols) VOCl$_3$ fed | TCE (mmols) fed | Hexane (liters) | Temp. (° C.) | MBN (mmols) | | | C$_2$/C$_3$/MBN (mol. parts) dropped in | Yield (gram) |
|---|---|---|---|---|---|---|---|---|---|---|---|---|
| | Type | Present | Fed | | | | | Type | Present | Fed | | |
| 3a [1] | Al(C$_2$H$_5$)$_2$Cl | 8 | 22 | 2 | 12.5 | 7.7 | 35 | 70% 2-MBN 30% 3-MBN. | 2 | 70 | 2/1/0.02 | 423 |
| 3b [1] | Al(C$_2$H$_5$)$_2$Cl | 8 | 7 | 1.5 | 6 | 7.3 | 30 | 70% 2-MBN 30% 3-MBN. | 2 | 29 | 2/1/0.02 | 170 |
| 3c [1] | Al(C$_2$H$_5$)$_2$Cl | 8 | 7 | 1.5 | 6 | 7.2 | 30 | 70% 2-MBN 30% 3-MBN. | 2 | 42 | 2/1/0.03 | 143 |
| 3d [1] | Al(C$_2$H$_5$)$_2$Cl | 8 | 7 | 1.5 | 6 | 7.2 | 30 | 70% 2-MBN 30% 3-MBN. | 4 | 48 | 2/1/0.04 | 101 |
| 3e [1] | Al(C$_2$H$_5$)$_2$Cl | 10 | 15 | 1.5 | | 7.1 | 30 | 70% 2-MBN 30% 3-MBN. | 5 | 10 | 2/1/0.02 | 80 |
| 3f [1] | Al(C$_2$H$_5$)$_3$ | 10 | 15 | 1.5 | | 7.1 | 30 | 70% 2-MBN 30% 3-MBN. | 5 | 7 | 2/1/0.02 | 65 |
| 3g [1] | Al(i-C$_4$H$_9$)$_3$ | 10 | 15 | 1.5 | | [2]7.1 | 30 | 70% 2-MBN 30% 3-MBN. | 5 | 8 | 2/1/0.02 | 68 |

| Example | Gram/hour mmol of V | Percent by weight of MBN | Mileage of MBN | Percent by weight of C$_3$H$_6$ | Percent of insoluble material in toluene | Reduced specific viscosity | $M_{L4}$ |
|---|---|---|---|---|---|---|---|
| 3a [1] | 106 | 2.56 | 93 | 38.5 | 0.48 | 1.28 | 40 |
| 3b [1] | 57 | 2.82 | 95 | 30.7 | 0.64 | 2.27 | 40 |
| 3c [1] | 48 | 4.21 | 85 | 33.0 | 1.0 | 2.23 | 39 |
| 3d [1] | 34 | 6.30 | 97 | 25.0 | 4.27 | 3.21 | 65 |
| 3e [1] | 27 | 2.74 | 90 | 37.4 | 0.71 | 2.53 | 44 |
| 3f [1] | 22 | 2.23 | 75 | 39.1 | 2.68 | 4.31 | >150 |
| 3g [1] | 23 | 2.48 | 78 | 38.4 | 2.53 | 4.25 | >150 |

[1] Beyond the scope of the present invention (comparative examples).
[2] Tetrachloroethylene.

Vulcanization

From the terpolymers indicated in Examples 1 to 3 vulcanizates were prepared with the following recipe:

| | Parts by weight |
|---|---|
| Terpolymer | 100 |
| HAF-black | 50 |
| ZnO | 5 |
| Tetramethylthiuram-monosulfide | 1.3 |
| Sulfur | 1 |

Vulcanization temperature: 160° C.

The most favorable combination of the mechanical properties was obtained with a MBN-content in the range from about 3.5 to 4.5% by weight (see Examples 1a, 1c, 1d).

An increase of the MBN-content exceeding 4.7% by weight brought about another increase of the modulus, but also an intolerable decrease of the elongation at break, the notched elongation and the impact strength. The permanent set was practically not reduced any more. The vulcanization speed could also not be increased further (see Examples 1g, 1i, 1k).

Terpolymers having a MBN-content less than 2% by weight (see Example 2a) were likewise deficient, as regards vulcanization speed, tensile strength, modulus and permanent set.

When instead of alkylaluminum sesquichlorides or alkylaluminum dichlorides, aluminum trialkyls or dialkylaluminum monochlorides were used as organo-metallic component of the Ziegler-type catalyst, there were obtained products the vulcanization speed of which was far lower and the static-mechanical properties were also distinctly poorer (see Examples 3a to 3g). Striking is above all the fact that it was not possible to prepare products having sufficiently low values as to the permanent set.

TABLE 5.—VULCANIZATE PROPERTIES

| Example | 1a | 1b | 1c | 1d | 1e | 1f | 1a[1] | 1h[1] | 2a[1] | 2b | 2c | 2d | 2e | 2f | 3a[1] | 3b[1] | 3c[1] | 3d[1] | 3e[1] | 3f | 3g[1] |
|---|---|---|---|---|---|---|---|---|---|---|---|---|---|---|---|---|---|---|---|---|---|
| Percent by weight of MBN | 3.48 | 3.51 | 4.03 | 3.13 | 3.24 | 5.68 | 12.14 | 13.31 | 1.35 | 2.64 | 2.54 | 2.70 | 2.60 | 2.65 | 2.56 | 2.82 | 4.21 | 6.30 | 2.74 | 2.23 | 2.48 |
| Percent by weight of C$_3$H$_6$ | 38.0 | 44.5 | 42.5 | 48.7 | 32.0 | 41.5 | 37.2 | 36.8 | 44.5 | 41.3 | 36.8 | 39.0 | 37.4 | 38.7 | 38.5 | 30.7 | 33.0 | 25.0 | 37.4 | 39.1 | 38.4 |
| Parts oil/100 pts. copolymer | 30 | 30 | 30 | | 50 | 30 | 30 | 25 | 50 | 50 | 50 | 50 | 35 | >150 | 40 | 40 | 39 | 65 | 44 | >150 | >150 |
| ML$_4$ (at 100° C.) | 94 | 112 | 112 | 43 | 102 | 115 | 118 | 87 | 105 | 109 | 150 | 170 | | 70 | | | | 42 | | 50 | 65 |
| ML$_4$ with oil | 48 | 49 | 50 | | 66 | 50 | 52 | 43 | 43 | 44 | 50 | 76 | 35 | 25 | 40 | 35 | 35 | 30 | 35 | 50 | 30 |
| Vulcanization time at 160° C. (minutes) | 20 | 20 | 20 | 25 | 25 | 20 | 20 | 20 | 65 | 25 | 15 | 15 | 20 | 20 | 36 | 28 | 28 | 25 | 28 | 78 | 35 |
| t$_{90}$/160° C. (minutes) | 16 | 16 | 16 | 20 | 20 | 16 | 15 | 15 | 26 | 25 | 10 | 10 | 17 | 17 | 87 | 191 | 148 | 187 | 180 | 36 | 30 |
| Tensile strength[2] (kilogram/cm.$^2$) | 208 | 214 | 215 | 211 | 220 | 182 | 201 | 212 | 163 | 194 | 200 | 210 | 192 | 220 | 440 | 630 | 630 | 490 | 550 | 133 | 147 |
| Elongation at break[2] (in percent) | 610 | 560 | 550 | 580 | 600 | 450 | 360 | 400 | 880 | 650 | 730 | 650 | 640 | 690 | 18 | 29 | 51 | 37 | 30 | 480 | 490 |
| Modulus[2] 100% | 16 | 17 | 20 | 16 | 16 | 21 | 27 | 27 | 11 | 14 | 16 | 19 | 17 | 18 | 28 | 52 | 83 | 68 | 53 | 16 | 18 |
| Modulus[2] 200% | 42 | 41 | 47 | 42 | 40 | 54 | 83 | 76 | 17 | 29 | 26 | 31 | 34 | 39 | 52 | 85 | 24 | 112 | 81 | 33 | 41 |
| Modulus[2] 300% | 82 | 85 | 95 | 82 | 86 | 107 | 160 | 149 | 131 | 62 | 52 | 64 | 66 | 80 | 12 | 30 | 240 | 28 | 22 | 68 | 78 |
| Impact strength[3] (kilogram/cm.) | 22 | 21 | 21 | 26 | 21 | 18 | 13.5 | 14 | 30.5 | 22 | 21 | 33 | 26 | 22 | 220 | 280 | 47 | 200 | 230 | 17 | 20 |
| Notched elongation[4] (in percent) | 230 | 230 | 220 | 280 | 230 | 190 | 110 | 130 | 520 | 290 | 320 | 270 | 300 | 280 | 61 | 48 | 79 | 42 | 45 | 200 | 240 |
| Resilience[5] (in percent) | 43 | 45 | 47 | 45 | 45 | 46 | 45 | 42 | 44 | 46 | 44 | 64 | 44 | 48 | 32/17 | 82 | 34/19 | 84 | 63 | 45 | 46 |
| Hardness[5] (IRHD) | 67 | 69 | 68 | 73 | 66 | 69 | 72 | 70 | 61 | 63 | 64 | 64 | 67 | 70 | | 42/26 | | 56/40 | 37/22 | 66 | 65 |
| Permanent set after 1 min./15 min. | 10/7 | 11/8 | 9/6 | 14/11 | 12/10 | 9/6 | 8/6 | 10/7 | 22/15 | 12/8 | 13/10 | 11/8 | 14/10 | 11/8 | | | | | | 35/19 | 37/21 |

[1] Beyond the scope of the present invention (comparative examples).
[2] German Industrial Standards 53504.
[3] 53507 with Standard II from 53504.
[4] 53512.
[5] 53503.

EXAMPLE 4

(Beyond the scope of the invention)

Continuous copolymerization.—The following diolefins were copolymerized instead of MBN with ethylene and propylene:

4a) 5 - (2' - butenyl-)-norbornene-2), "BN" (see Example 5-(2'-butenyl-)-norbornene-2), "BN" (see Example 4a) 5 - (3',5' - dimethyl - 4' - hexenyl)-norbornene-2), "DMHN" (see Example 4b), endo - dicyclopentadiene, "DCP" (Example 4c).

The polymerization was carried out in the manner described in Example 1. The details can be seen from Table 6.

TABLE 6.—CONTINUOUS COPOLYMERIZATION WITH DIFFERENT DIOLEFINS AT ELEVATED PRESSURE

| Ex. | Diolefin | Temp. (° C.) | Press. (atm.) | Throughout lit. hexane/hour | Retention time (in min.) | C$_2$H$_4$/C$_3$H$_6$/ diolefin (mol. parts) | VOCl$_3$ (mmol/ liter) | Al/V/TCE (mol. pts.) | Polymer content of the solution (percent by weight) | Catalyst mileage (g. polym/ g. VOCl$_3$) |
|---|---|---|---|---|---|---|---|---|---|---|
| 4a[1] | BN | 50 | 3 | 30 | 30 | (1:2.5:0.018) | 0.2 | 12:1:3 | 4.9 | 954 |
| 4b[1] | DMHN | 48 | 3 | 30 | 30 | (1:2.5:0.018) | 0.2 | 12:1:3 | 5.4 | 1050 |
| 4c[1] | DCP | 44 | 3 | 30 | 30 | (1:2.75:0.04) | 0.2 | 12:1:3.4 | 3.5 | 689 |

| Ex. | Percent by weight of C$_2$H$_6$ in polymer | Percent by weight of diolefin in polymer | Mooney-viscosity | Mileage of diolefin (in percent) | Reduced specific viscosity | Percent of insoluble material in toluene | Ash content (percent by weight) |
|---|---|---|---|---|---|---|---|
| 4a[1] | 45 | 3.80 | 118 | 92 | 2.65 | 0.57 | 0.03 |
| 4b[1] | 44 | 4.65 | 95 | 90 | 2.53 | 0.05 | 0.03 |
| 4c[1] | 48 | 4.62 | 117 | 60 | 2.93 | 1.04 | 0.06 |

[1] Beyond the scope of the present invention (comparative examples).

Vulcanization

Some of the terpolymer indicated in Example 1 (1c, 1f, 1g) and in Example 4 were used to prepare vulcanizates with the following recipe:

| | Parts by weight |
|---|---|
| Terpolymer | 100 |
| JSAF-Black | 75 |
| Mineral oil (naphthenic) | 50 |
| ZnO | 5 |
| Teteramethylthiuram disulfide | 1.5 |
| 2-mercaptobenzothiazol | 0.75 |
| Sulfur | 1 |

Vulcanization temperature: 150° C.
Vulcanization period: 30 and 60 minutes.

The vulcanizate properties mentioned in Table 7 show:

(1) That a higher MBN-content in the terpolymers, which is beyond the scope of the invention (see Examples 1f and 1g) leads to distinctly poorer results concerning the static and dynamic vulcanizate test and the thermal aging test.

(2) That terpolymers having a comparable insaturation, i.e. the number of double bonds per 1,000 carbon atoms, but containing diolefins different from MBN (see Examples 4a, 4b and 4c) exhibit too poor a stability to thermal aging and/or have poorer dynamic test results.

TABLE 7.—VULCANIZATE PROPERTIES

| Example | | 1c | 1f [1] | 1g [1] | 4a [1] | 4b [1] | 4c [1] |
|---|---|---|---|---|---|---|---|
| Double bond/1000 carbon atoms | | 3.5 | 5.1 | 7.5 | 3.6 | 3.2 | 4.9 |
| $M_{L4}$ | | 112 | 115 | 126 | 118 | 95 | 117 |
| Tensile strength [3] (kilopond/cm.²) | 30 min | 197 | 137 | 133 | 186 | 215 | 211 |
| | 60 min | 209 | 180 | 192 | 191 | 214 | 229 |
| Elongation at break [3] (in percent) | 30 min | 670 | 640 | 500 | 590 | 720 | 660 |
| | 60 min | 640 | 540 | 450 | 490 | 610 | 600 |
| | Aging [2] | 620 | 460 | 370 | 340 | 580 | 320 |
| Modulus 300% [3] (kilopond/cm.²) | 30 min | 56 | 43 | 63 | 73 | 66 | 61 |
| | 60 min | 64 | 74 | 109 | 88 | 68 | 79 |
| | Aging [2] | 66 | 82 | 118 | 107 | 69 | 104 |
| IR-hardness [4] (IRHD) | 30 min | 62 | 57 | 62 | 68 | 63 | 63 |
| | 60 min | 62 | 65 | 65 | 68 | 63 | 64 |
| | Aging [2] | 63 | 67 | 68 | 71 | 63 | 68 |
| Permanent set [5] (in percent) | 30 min | 10 | 12 | 9 | 11 | 12 | 11 |
| | 60 min | 10 | 8 | 6 | 9 | 11 | 9 |
| Heat build-up [6] ΔT (° C.) | 30 min | 43 | | | >70 | 60 | >70 |
| | 60 min | 35 | 28 | 25 | 44 | 43 | 47 |
| Permanent deformation (in percent) [6] | 30 min | 21.0 | | | 29.5 | | |
| | 60 min | 11.5 | 5.6 | 2.8 | 17.5 | 15.6 | 17.5 |
| Goodrich-Belt test [7] (hours) | 30 min | 7 | | | 2.5 | 8 | 7 |
| | 60 min | 6.5 | 4 | 2 | 2.5 | 4 | 3 |

[1] Beyond the scope of the present invention (comparative examples).
[2] Thermal aging of the 60 minutes, heating step at 120° C. over a period of 14 days.
[3] German Industrial Standards 53504 at 20° C.
[4] German Industrial Standards 53503 at 20° C.
[5] After elongation by 150%/hour and a relaxation for 15 minutes at 20° C.
[6] ASTM D 623-52 T: initial temperature: 40° C., ΔT and permanent deformation after 30 minutes.
[7] Rubber Chem. Techn. 38/4 (1965), 719: test-temperature: 70° C.

We claim:

1. A process for preparing copolymers capable of being vulcanized with sulfur to yield elastomers comprising copolymerizing from 20 to 75% by weight ethylene, from 75 to 20% by weight propylene and 2.5 to 4.0% by weight of a norbornene selected from the group consisting of 5-(2'-methyl-2'-butenyl-)-norbornene - (2), 5-(3'-methyl-2'-butenyl-)-norbornene-(2) and mixtures thereof in the presence of a catalyst comprising a mixture of (a) a vanadium halide compound selected from the group consisting of $VOCl_3$, $VCl_4$, $VO(OC_2H_5)Cl_2$ and $VO(OC_2H_5)_2Cl$, and (b) an organo-aluminum compound having the formula $R_3Al_2Cl_3$, an organo-aluminum compound having the formula $RAlCl_2$, or mixtures thereof in which formulae R represents alkyl having 1 to 6 carbon atoms.

2. The process of claim 1 wherein propylene is employed in an amount of 32–49% by weight.

3. A process as claimed in claim 1 wherein copolymerization is carried out in the presence of a reactivator selected from the group consisting of trichloracetic acid ester, thionyl chloride, hexachlorocyclopentadiene or hexachlorocyclopentenone.

4. A process as claimed in claim 1 wherein copolymerization is carried out in the presence of a mixture of $VOCl_3$, $(C_2H_5)_3Al_2Cl_3$ and a member selected from the group consisting of $Cl_3C$—$COOCH_3$, $Cl_3C$—$COOC_2H_5$ and mixtures thereof.

5. A process as claimed in claim 1 wherein the reactivator is trichloracetic acid ester or thionyl chloride and the molar ratio of organo-aluminum compound referred to aluminum and trichloroacetic acid ester or thionyl chloride ranges from 2 to 8 and the molar ratio of vanadium halide to trichloroacetic acid ester or thionyl chloride ranges from 0.1 to 1.0.

6. A copolymer of 20 to 75% by weight ethylene, 75 to 20% by weight propylene and 2.5 to 4.0% by weight of a norbornene selected from the group consisting of 5-(2'-methyl-2'-butenyl-)-norbornene - (2), 5-(3'-methyl-2'-butenyl-)-norbornene-(2) and mixtures thereof prepared by polymerizing the ethylene, propylene and norbornene in the presence of a catalyst comprising a mixture of (a) a vanadium halide compound selected from the group consisting of $VOCl_3$, $VCl_4$, $VO(OC_2H_5)Cl_2$ and $VO(OC_2H_5)_2Cl$, and (b) an organo-aluminum compound having the formula $R_3Al_2Cl_3$, an organo-aluminum compound having the formula $RAlCl_2$ or mixtures thereof in which formulae R represents alkyl having 1 to 6 carbon atoms.

7. A copolymer according to claim 6 wherein the norbornene is a mixture of 5-(2'-methyl-2'-butenyl)-norbornene-(2) and 5-(3'-methyl-2'-butenyl) - norbornene-(2) and the norbornene is present in from 2.5–4.0% by weight and the propylene is present in from 32–49% by weight.

References Cited

UNITED STATES PATENTS 3,093,620  6/1963  Gladding et al. _____ 260—79.5
3,349,064  10/1967 Gumboldt et al. _____ 260—80.7

OTHER REFERENCES

Chem. Abst. 63 (1965), 10091b.
Chem. Abst. 65 (1966), 10688b.

JOSEPH L. SCHOFER, Primary Examiner
C. A. HENDERSON, JR., Assistant Examiner

U.S. Cl. X.R.

260—79.5